United States Patent
Hill

(10) Patent No.: US 7,190,309 B2
(45) Date of Patent: Mar. 13, 2007

(54) RADIO SIGNAL TRANSMITTER WITH MULTIPLE ANTENNAS FOR IMPROVED POSITION DETECTION

(76) Inventor: Edward L. Hill, 16 Walker St., Kittery, ME (US) 03904

( * ) Notice: Subject to any disclaimer, the term of this patent is extended or adjusted under 35 U.S.C. 154(b) by 0 days.

(21) Appl. No.: 11/235,508

(22) Filed: Sep. 26, 2005

(65) Prior Publication Data

US 2006/0066486 A1    Mar. 30, 2006

Related U.S. Application Data

(60) Provisional application No. 60/612,941, filed on Sep. 24, 2004.

(51) Int. Cl.
*G01S 3/02*    (2006.01)
(52) U.S. Cl. .................. 342/465; 342/442; 342/463
(58) Field of Classification Search .............. 342/442, 342/443, 457, 463–465; 455/456.1, 456.5, 455/456.6, 457

See application file for complete search history.

(56) References Cited

U.S. PATENT DOCUMENTS

| | | | | |
|---|---|---|---|---|
| 3,706,096 A | * | 12/1972 | Hammack | .................. 342/107 |
| 5,150,310 A | * | 9/1992 | Greenspun et al. | ......... 342/451 |
| 5,191,342 A | * | 3/1993 | Alsup et al. | ................ 342/465 |
| 6,577,272 B1 | * | 6/2003 | Madden | ..................... 342/387 |
| 2003/0146871 A1 | * | 8/2003 | Karr et al. | ................... 342/457 |

* cited by examiner

*Primary Examiner*—Dao L. Phan
(74) *Attorney, Agent, or Firm*—Gifford, Krass, Groh, Sprinkle, Anderson & Citkowski, PC

(57) ABSTRACT

A radio frequency (RF) signal transmission device (the "device") is used as a tracked target in a position tracking system (the "system"). In the preferred embodiments, the device's position is determined by analyzing the time difference of arrival of the device's RF signals received at multiple receivers which are part of the system. The device has two antennas spaced a known distance apart and the device alternately transmits on these antennas or can use code-division multiplexing for individual antenna's signal detection. The system detects the position of both antennas at their respective phase center and determines the distance between the two calculated antenna positions. By comparing the calculated distance to actual known distance the system can assess the quality of the calculated positions.

1 Claim, 2 Drawing Sheets

RADIO SIGNAL TRANSMITTER WITH MULTIPLE ANTENNAS FOR IMPROVED POSITION DETECTION

REFERENCE TO RELATED APPLICATION

This application claims priority from U.S. Provisional Patent Application Ser. No. 60/612,941, filed Sep. 24, 2004, the entire content of which is incorporated herein by reference.

FIELD OF THE INVENTION

This invention relates generally to wireless tracking systems and, in particular, to a radio signal transmitter with multiple antenna for improved position detection.

BACKGROUND OF THE INVENTION

In many applications it is desirable to track, in a non-contact manner, the position of an object as it moves through 3-dimensional space. One method of accomplishing this is to embed an RF transmitter in the object to be tracked. Multiple RF receivers, positioned at known locations, capture the transmitted signal from the object to be tracked. Because the RF energy propagates at a known velocity, the differences in arrival time of the signal at any one pair of the receivers can be used to determine the possible positions of the tracked object in two dimensions.

If the above is carried out using several pairs of receivers, the object's position can be determined in three dimensions. A minimal setup for 3D object tracking utilizes four receivers, one that serves as a common reference for each of the other three receivers. By measuring the time difference of arrival of the signal at each of these three pairs, the resulting system of 3 equations and 3 unknowns (x, y, z coordinates) can be solved and the object's position determined.

Several problems may occur with this type of system. First, nearby sources of RF energy may interfere with the clean reception of the tracked object's RF transmission. Second, RF energy transmitted by the object to be tracked may reflect off of interfering surfaces and generate echo signals which may be received by the receiver and distort the true, direct path arrival time. The latter issue is know as multipath interference and may reduce system accuracy. It is desirable to develop methods to overcome the effects of multipath interference and maintain system accuracy.

SUMMARY OF THE INVENTION

Broadly according to this invention, a radio frequency (RF) signal transmission device (the "device") used as a tracked target in a position tracking system (the "system"). In the preferred embodiments, the device's position is determined by analyzing the time difference of arrival of the device's RF signals received at multiple receivers which are part of the system. The device has two antennas spaced a known distance apart and the device alternately transmits on these antennas or can use code-division multiplexing for individual antenna's signal detection. The system detects the position of both antennas at their respective phase center and determines the distance between the two calculated antenna positions. By comparing the calculated distance to actual known distance the system can assess the quality of the calculated positions.

DETAILED DESCRIPTION OF THE INVENTION

Figure 1:
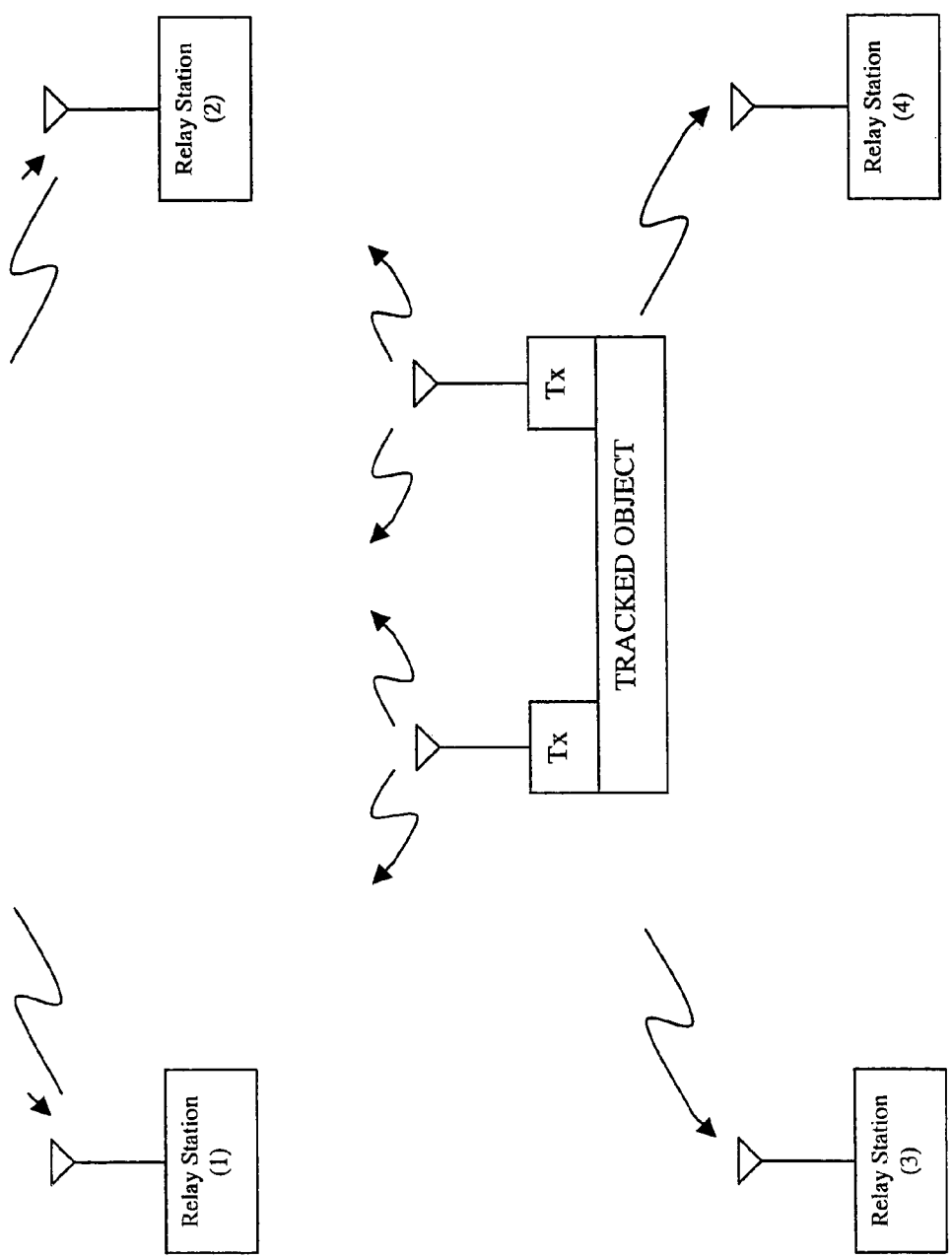
FIG. 1 shows a tracked object with two antennas being tracked by 4 receivers.
Figure 2:
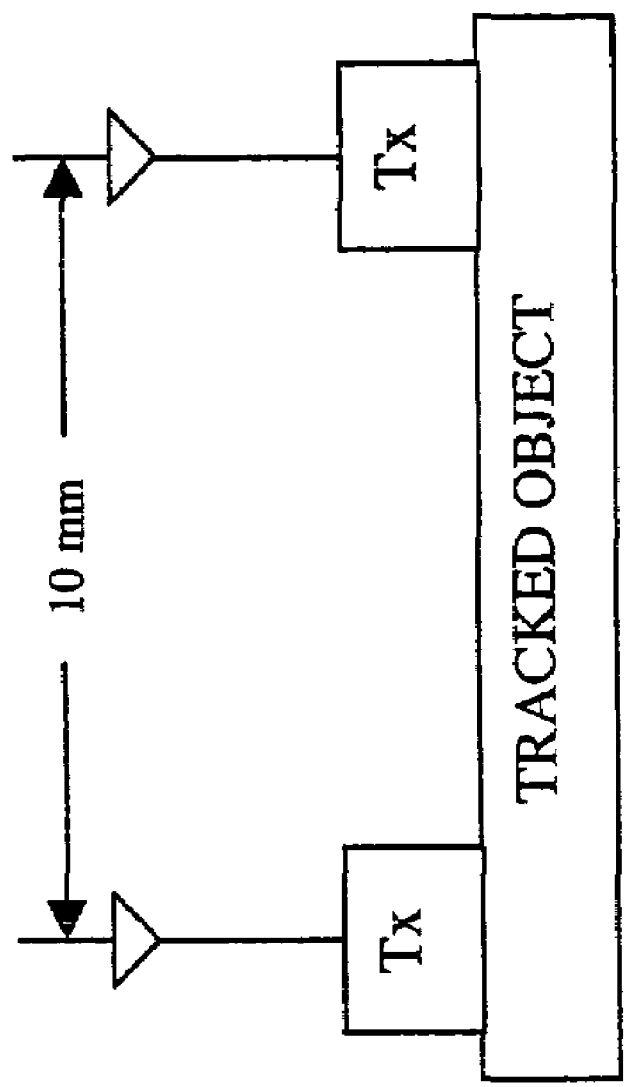
FIG. 2 shows the tracked object with two antennas in detail, with a spacing of 10 mm between the antennas.

One method of dealing with multipath interference is to increase the number of receivers in the system. By increasing the number, we introduce redundancy and also increase the possibility that at least some of the receivers are not receiving multipath interference. While this is a promising technique, it is also necessary to develop a method of reliably determining which of the receivers are compromised by multipath interference so that those receivers can be ignored in the subsequent position calculation. This application describes a modification of the transmitting device that provides a method of determining if a receiver has been compromised by multipath interference.

The invention involves modification of a traditional RF transmitter to include at least two transmitting antennas, spaced a fixed, known distance apart. The transmitter also incorporates a switch that will allow the output of the transmitter to be directed to either of the two antennas at any given time. Although the transmitter can also use coding allowing simultaneous transmission at each antenna, our example will feature the time separate transmission feature.

During normal system operation, the transmitter alternately transmits on each of the antennas, switching between them at a fixed rate. The transmitted signal is received as usual by the receivers of the system and the object position calculations are made in the customary manner. However, because the transmitter is alternating between the antennas, the position determination system should record a time varying position, even if the tracked object is stationary. The calculated position should vary between two points that are separated by a distance equal to the known spacing between the transmit antennas The system will perform the object position calculation over all of the possible receiver combinations. For example, in a system with 8 receivers, there are 70 possible combinations of 4 receivers that can be used to determine the tracked object's position. Any group of receivers that does not produce the correct differential spacing (within some tolerance) will be rejected as being compromised by interference and will not be used in the position determination. The remaining groupings that produced the proper differential spacing are likely to be uncompromised by interference and produce a highly accurate position.

I claim:

1. A system for tracking an object, comprising:
a transmitter carried on or embedded within the object, each transmitter transmitting an electromagnetic signal either through physically separated antennas on or within the object or through the use of code-division multiplexing;
using multiple, physically separated antennas on or within the object;
a plurality of receiver stations operative to receive the electromagnetic signal from the antennas; and
a processor operative to determine the position of the object in multiple dimensions based upon the time difference of arrival of the signals transmitted by the transmitter and assess the quality of the calculated positions based upon the phase center of the received signals.

* * * * *